United States Patent
Kwon

(10) Patent No.: US 12,481,192 B2
(45) Date of Patent: Nov. 25, 2025

(54) DISPLAY PANEL AND METHOD OF MANUFACTURING THE SAME

(71) Applicant: KOREA ELECTRONICS TECHNOLOGY INSTITUTE, Seongnam-si (KR)

(72) Inventor: Soon Hyung Kwon, Seongnam-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 370 days.

(21) Appl. No.: 18/224,439

(22) Filed: Jul. 20, 2023

(65) Prior Publication Data
US 2024/0061301 A1 Feb. 22, 2024

(30) Foreign Application Priority Data
Aug. 19, 2022 (KR) .................. 10-2022-0104090

(51) Int. Cl.
*G02F 1/155* (2006.01)
*G02F 1/1333* (2006.01)
*G02F 1/167* (2019.01)

(52) U.S. Cl.
CPC ........ *G02F 1/155* (2013.01); *G02F 1/133382* (2013.01)

(58) Field of Classification Search
CPC ............. G02F 1/155; G02F 1/133382; G02F 1/16756; G02F 1/1675; G02F 1/167; G02F 1/16755; G02F 1/133305; G02F 1/133385; G02F 1/16757; G02F 1/1676; G02F 1/1685
See application file for complete search history.

(56) References Cited

U.S. PATENT DOCUMENTS

| 7,767,048 B2 | 8/2010 | Kanbayashi |
| 10,312,271 B2* | 6/2019 | Liu ............ H10D 86/0212 |
| 10,483,289 B2* | 11/2019 | Li ................ H10D 86/40 |

FOREIGN PATENT DOCUMENTS

| KR | 10-2012-0035535 A | 4/2012 |
| KR | 10-2019-0131513 A | 11/2019 |
| KR | 10-2021-0007711 A | 1/2021 |

(Continued)

OTHER PUBLICATIONS

Office Action issued on Apr. 8, 2024, for corresponding Korean Patent Application No. 10-2022-0104090, along with an English machine translation (8 pages).

*Primary Examiner* — Tuyen Tra
(74) *Attorney, Agent, or Firm* — Hauptman Ham, LLP

(57) ABSTRACT

A display panel and a method of manufacturing the same are disclosed. The display panel includes a display area configured to display an image, and a curved area formed at a part or the entirety of the display area. The display area includes a first substrate, at least one first heat dissipation layer formed on the first substrate, a capsule layer disposed on the first heat dissipation layer while including a plurality of capsules configured to represent a color, a second heat dissipation layer formed on the capsule layer and made of a transparent material, and a second substrate formed on the second heat dissipation layer and made of a transparent material. The display panel may not be broken by heat even when the display panel having a flat structure is subjected to thermoforming.

19 Claims, 11 Drawing Sheets

(56) References Cited

FOREIGN PATENT DOCUMENTS

| KR | 10-2022-0094369 A | 7/2022 |
|---|---|---|
| WO | 2018/178797 A1 | 10/2018 |
| WO | 2019/208422 A1 | 10/2019 |

\* cited by examiner

DISPLAY PANEL AND METHOD OF MANUFACTURING THE SAME

CROSS REFERENCE TO RELATED APPLICATION

The present application claims priority to Korean Patent Application No. 10-2022-0104090, filed Aug. 19, 2022, the entire contents of which is incorporated herein for all purposes by this reference.

BACKGROUND OF THE INVENTION

Field of the Invention

The present disclosure relates to a display panel and a method of manufacturing the same.

Description of the Related Art

Generally, display panels are manufactured to have a flat structure. Such a display panel is used in various products such as a monitor, a smartphone, a kiosk, a billboard, etc. Recently, a product, to which a display panel having a curved surface is applied, has been introduced. For example, a curved monitor is a representative product to which a display panel having a curved surface is applied. However, existing display panels, which have a curved surface, have a single curved surface structure simply having a curvature in one direction. In order to apply a display panel to surfaces of products having various shapes, a display panel having a complex curved surface is needed.

RELATED ART LITERATURE

Patent Documents

Patent Document 1: U.S. Pat. No. 7,767,048 B2

SUMMARY OF THE INVENTION

Therefore, the present disclosure has been made in view of the above problems, and it is an object of the present disclosure to provide a display panel having a curved surface at at least a portion thereof and a method of manufacturing the same.

In accordance with an aspect of the present disclosure, the above and other objects can be accomplished by the provision of a display panel including a display area configured to display an image, and a curved area formed at a part or an entirety of the display area.

In accordance with an embodiment, the display area may include a first substrate, at least one first heat dissipation layer formed on the first substrate, a capsule layer disposed on the first heat dissipation layer while including a plurality of capsules configured to represent a color, a second heat dissipation layer formed on the capsule layer and made of a transparent material, and a second substrate formed on the second heat dissipation layer and made of a transparent material.

In accordance with an embodiment, the display panel may further include a first heat blocking layer formed between the first substrate and the first heat dissipation layer and made of a material having low thermal conductivity, and a second heat blocking layer formed between the second heat dissipation layer and the second substrate and made of a material having low thermal conductivity.

In accordance with an embodiment, the capsules may be made of a flexible material so that, when the capsules are deformed, the capsule disposed in the curved area has a diameter greater than a diameter of the capsule disposed in an area other than the curved area.

In accordance with an embodiment, each of the capsules may include a plurality of quantum dots dispersed by a solvent, and the first heat dissipation layer and the first substrate may be made of a transparent material.

In accordance with an embodiment, the display panel may further include a plurality of lower electrodes formed between the first heat dissipation layer and the capsule layer and spaced apart from one another, and one upper electrode or a plurality of spaced upper electrodes formed between the capsule layer and the second heat dissipation layer and made of a transparent material having electrical conductivity. Each of the capsules may include a plurality of electrophoretic particles movable by an electric field formed between the lower electrodes and the upper electrode or electrodes in accordance with a pixel control signal.

In accordance with an embodiment, the display panel may further include a first insulating layer formed between the first heat dissipation layer and the lower electrodes and made of an electrical insulating material, and a second insulating layer formed between the second heat dissipation layer and the upper electrode or electrodes and made of an electrical insulating material.

In accordance with an embodiment, the display panel may further include a first insulating layer formed between the first heat dissipation layer and the lower electrodes and made of an electrical insulating material, and the second heat dissipation layer and the upper electrode may be formed as a single continuous layer.

In accordance with an embodiment, the display panel may further include a transmission area configured to transmit the pixel control signal to the display area. The transmission area may include a plurality of first electrode patterns connected to the lower electrodes, one second electrode pattern or a plurality of second electrode patterns connected to the upper electrode or electrodes, and a third insulating layer configured to insulate the first electrode patterns and the second electrode pattern or patterns. The first electrode patterns and the second electrode pattern or patterns may be concentrated, at one-side ends thereof, in a connector area, for connection thereof to a circuit board configured to output the pixel control signal.

In accordance with an embodiment, the display panel may further include a transmission area configured to transmit the pixel control signal to the display area, and a spare area surrounding the display area and the transmission area. The curved area may be formed at a part or entirety of the display area, the transmission area or the spare area.

In accordance with an embodiment, each of the first substrate and the second substrate may be formed of a thin glass having a thickness of 1 mm or less.

In accordance with an embodiment, the display panel may further include a first thermoforming film disposed at a lower surface of the first substrate and configured to maintain a shape deformed through thermoforming, and a second thermoforming film disposed at an upper surface of the second substrate, made of a transparent material, and configured to maintain a shape deformed through thermoforming.

In another aspect of the disclosure, there is provided a method of manufacturing a display panel, including forming a flat display panel including a display area configured to display an image through stacking of a first substrate, a first heat dissipation layer, a capsule layer, a second heat dissipation layer, and a second substrate, connecting the first heat dissipation layer and the second heat dissipation layer to a cooler, and forming a curved surface at a part or an entirety of the display area through application of heat to the first substrate and the second substrate, wherein, in the forming a curved surface, heat transferred to a capsule of the capsule layer is dissipated to the cooler via the first heat dissipation layer or the second heat dissipation layer.

In accordance with an embodiment, in the forming a flat display panel, the first heat dissipation layer or the second heat dissipation layer wider than the display panel may be stacked such that at least a portion of the first heat dissipation layer or the second heat dissipation layer protrudes outside the display panel, thereby forming a heat dissipation path, and, in the connection to a cooler, a heat dissipation path of the first heat dissipation layer or a heat dissipation path of the second heat dissipation layer may be connected to the cooler.

In accordance with an embodiment, in the forming a flat display panel, a first heat blocking layer made of a material having low thermal conductivity may be further formed between the first substrate and the first heat dissipation layer, and a second heat blocking layer made of a material having low thermal conductivity may be further formed between the second heat dissipation layer and the second substrate.

In accordance with an embodiment, in the forming a flat display panel, a plurality of spaced lower electrodes may be further formed between the first heat dissipation layer and the capsule layer in the display area, a single continuous upper electrode or a plurality of spaced upper electrodes may be further formed between the capsule layer and the second heat dissipation layer in the display area, and a plurality of first electrode patterns connected to the lower electrodes and one second electrode pattern or a plurality of second electrode patterns connected to the upper electrode or electrodes may be further formed in a transmission area connected to the display area.

In accordance with an embodiment, in the forming a flat display panel, the second heat dissipation layer and the upper electrode may be formed as a single continuous layer, using a transparent material having electrical conductivity.

In accordance with an embodiment, in the forming a flat display panel, a heat transfer path configured to thermally interconnect the first heat dissipation layer and the second heat dissipation layer may be further formed.

In accordance with an embodiment, the method may further include cutting a portion of the display panel corresponding to a removal area, except for the display area configured to display an image, a transmission area configured to transmit a pixel control signal to the display area, and a spare area surrounding the display area and the transmission area.

In accordance with an embodiment, in the forming a curved surface, a portion of the flat display panel to be formed into a curved area may be heated and pressed using a first mold and a second mold formed to have a predetermined curved surface shape, thereby thermoforming the first substrate and the second substrate.

Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for best explanation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
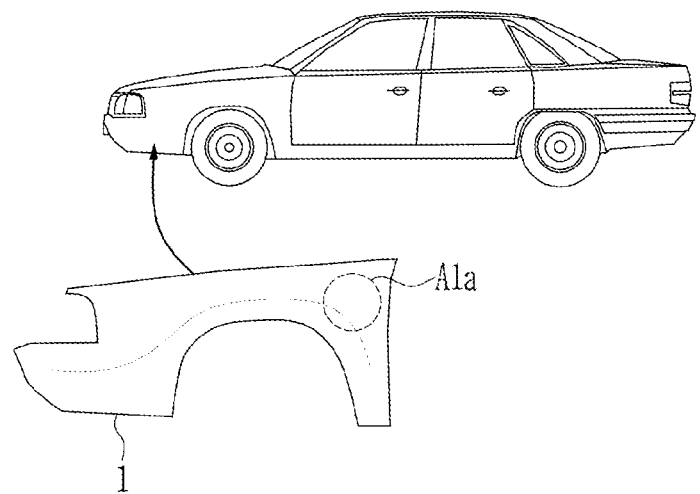
FIG. 1 is a view showing the case in which a display panel of the present disclosure is used at an exterior of a vehicle in accordance with an embodiment.

Objects, particular advantages and new features of the present disclosure will be more clearly understood from the following detailed description and preferred embodiments taken in conjunction with the accompanying drawings. However, the present disclosure is not limited to the embodiments. In the following description, when a detailed description of the relevant known function or configuration is determined to unnecessarily obscure the subject matter of the present disclosure, such detailed description will be omitted.

In the specification, in adding reference numerals for elements in each drawing, it should be noted that like reference numerals already used to denote like elements in one drawing are also used to denote the elements in another drawing wherever possible.

It should be noted that terms used herein are merely used to describe a specific embodiment, not to limit the present disclosure. Incidentally, unless clearly used otherwise, singular expressions include a plural meaning.

The drawings are not necessarily to scale and, in some instances, proportions may be exaggerated or schematically illustrated in order to clearly illustrate features of the embodiments.

It should be further understood that the terms "comprises", "comprising,", "has", "having", "includes" and/or "including", when used herein, specify the presence of stated features (for example, integers, functions, operations, or constituent elements such as components, but do not preclude the presence of other features.

In addition, the terms "one", "the other", "first", "second", etc. are used to differentiate one constituent element from another constituent element, and these constituent elements should not be limited by these terms.

Meanwhile, it should be understood that, when terms representing directions such as upwards, downwards, left, right, X-axis, Y-axis, Z-axis, etc. are used in the specification, these terms are merely for convenience of description, and such directions may be expressed differently from those represented by the terms, in accordance with the viewing position of an observer or the position at which an object is disposed.

Embodiments described in the present disclosure and the accompanying drawings are not intended to limit the present disclosure to the particular forms disclosed, but on the contrary, the present disclosure should be understood to cover all modifications, equivalents, and/or alternatives of the embodiments.

Hereinafter, an exemplary embodiment of the present disclosure will be described in detail with reference to the accompanying drawings.

Figure 2:
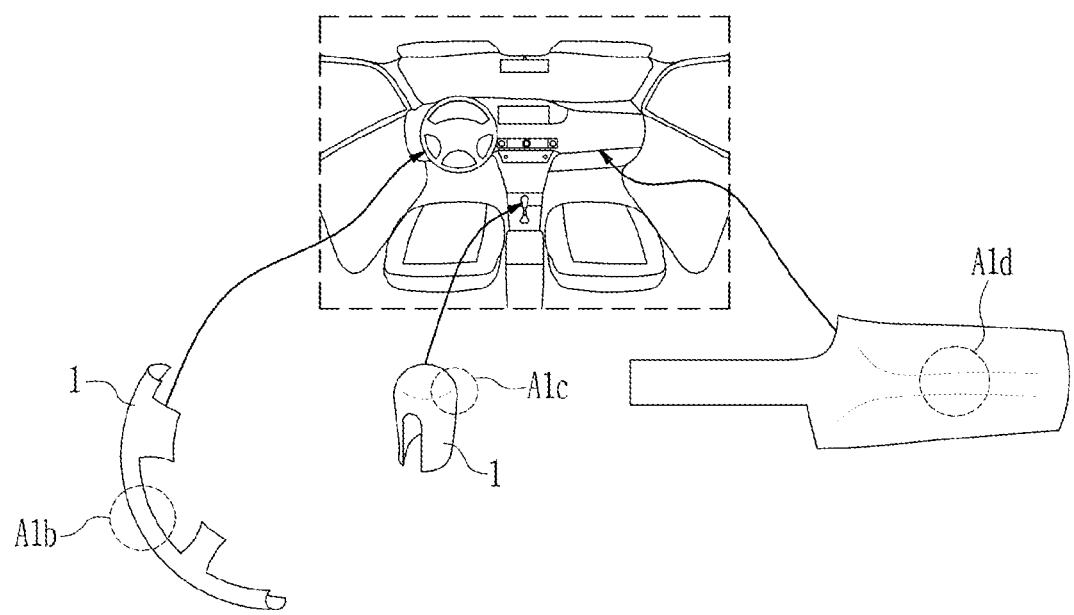
FIG. 2 is a view showing the case in which the display panel of the present disclosure is used at an interior of a vehicle in accordance with another embodiment.

FIG. 1 is a view showing the case in which a display panel 1 of the present disclosure is used at an exterior of a vehicle in accordance with an embodiment. FIG. 2 is a view showing the case in which the display panel 1 of the present disclosure is used at an interior of a vehicle in accordance with another embodiment.

The display panel 1 according to the present disclosure includes a curved surface at at least a portion thereof, differently from a general display formed to have a flat structure. In the specification, the curved surface includes all of a single curved surface, a double curved surface, a complex curved surface, a free curved surface, a coupled structure of a plurality of curved surfaces, etc. The curved surface may have a concave shape, a convex shape, and a connected shape of a concave shape and a convex shape in terms of three-dimensional shape. The curved shape is a concept including even a folding portion. A curved surface included in a display may have various shapes. Such a curved surface may be expressed as a surface formed through connection of a plurality of curvatures.

For example, the display panel 1 according to the present disclosure may be formed to include a curved surface having the same curvature as that of a curved surface of an outer plate of a vehicle. In FIG. 1, "A1a" designates a curved surface of a display panel 1 attachable to an exterior of a vehicle. In addition, the display panel 1 according to the present disclosure may be formed to include a curved surface having the same curvature as that of a center fascia or a dashboard at an interior of a vehicle. In FIG. 2 "A1b" designates a curved surface of a display panel 1 attachable to a handle, "A1c" designates a curved surface of a display panel 1 attachable to a head of a gear stick, and "A1d" designates a curved surface of a display panel 1 attachable to a dashboard. In addition, the display panel 1 according to the present disclosure is applicable to a housing of a center fascia display, a dial button, etc.

The owner of a vehicle may change an exterior color of the vehicle using the display panel 1. The vehicle owner may change a color of a dashboard, a handle, or a housing of a center fascia display. The vehicle owner may display characters, an image, video, etc., as well as a color. The vehicle may represent a state thereof, or may visually represent feedback for user control through the display panel 1. When an air conditioner is controlled through rotation of a dial, intensity, temperature, etc. of air may be displayed through the display panel 1 which has a curved surface applied to the dial.

In addition, the display panel 1 according to the present disclosure may be applied to a home electronic appliance or furniture. The display panel 1 may be formed at an outer surface of the home electronic appliance or furniture. The owner of the home electronic appliance or furniture may change a color of the home electronic appliance or furniture by changing a color of the display panel 1. As described above, the display panel 1 may be attached to exteriors of various articles.

Figure 3:
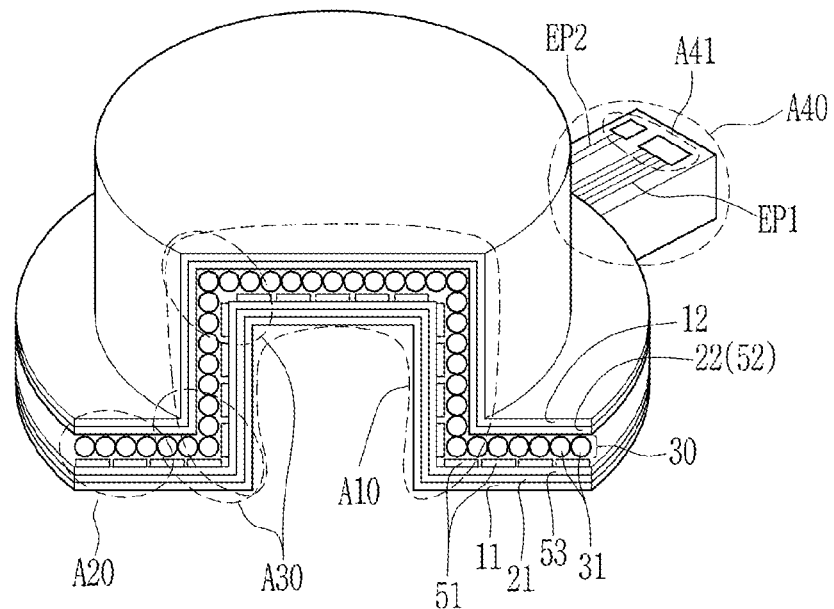
FIG. 3 is a view showing the case in which the display panel of the present disclosure has a button-shaped curved surface in accordance with an embodiment.

FIG. 3 is a view showing the case in which the display panel 1 of the present disclosure has a button-shaped curved surface in accordance with an embodiment.

As shown in FIG. 3, the display panel 1 may be formed to include a curved surface protruding toward a second substrate 12. In other words, the display panel 1 may be formed to wholly have a cup shape, a button shape, or a dial shape. As shown in FIG. 3, the display panel 1, which is molded to have a curved surface protruding in the form of a circular column, may be applied to a button or a dial. It should be understood that the display panel 1 according to the present disclosure may have a curved surface having various shapes without being limited to the shapes shown in FIGS. 1, 2, and 3.

The display panel 1 may include a display area A10 configured to display an image, and a curved area A30 formed at a part or the entirety of the display area A10. The display panel 1 may further include a transmission area A40 configured to transmit a pixel control signal to the display area A10. The display panel 1 may further include a spare area A20 surrounding the display area A10 and the transmission area A40. The curved area A30 may be formed at a part or the entirety of the display area A10, the transmission area A40, or the spare area A20.

The display area A10 is an area configured to display an image in the display panel 1. The display area A10 is an area applied to a product, to visually provide information. The display area A10 may display a color, an image, a text, a numeral, etc. in accordance with pixel control. A pixel formed in the display area A10 may have a diversity of shapes. The pixel may be provided in plural such that plural pixels are arranged in a matrix. In this case, each pixel may be formed to have a symbol or pattern shape.

The spare area A20 is an area surrounding the display area A10. The spare area A20 may not display an image. The spare area A20 may be hidden by other elements of a product, to which the display panel 1 is applied, and, as such, may not be visually observed. The spare area A20 may be disposed between the transmission area A40 and the display area A10, and may be visually observed.

The transmission area A40 is an area configured to transmit a pixel control signal to the display area A10. The transmission area A40 may include a plurality of electrode patterns. The transmission area A40 may include a connector area A41 having a portion where one-side ends of the plurality of electrode patterns are concentrated, for connection of the plurality of electrode patterns to an external circuit board 2. The curved area A30 is a portion of the display panel 1 where a curved surface is formed. The curved area A30 may be formed at a part or the entirety of the display area A10, the spare area A20, and the transmission area A40. The curved area A30 may be formed to overlap with one or more of the display area A10, the spare area A20, and the transmission area A40.

In FIGS. 1 and 2, in association with each of the exterior plate type display panel 1, the handle type display panel 1, the dashboard type display panel 1, and the gear stick head type display panel 1, only the display area A10 and the curved area A30 thereof are shown, and the spare area A20 and the transmission area A40 thereof are omitted.

In FIG. 3, the display area A10 may be formed to extend along an upper surface and a side surface of the display panel 1 which has a button-shaped curved surface. The display area A10 may be formed only at a part of the upper surface or the side surface of the display panel 1 having the button-shaped curved surface in accordance with disposition of pixels. The spare area A20 may be formed along a periphery of a lower portion of the display panel 1 having the button-shaped curved surface. The transmission area A40 may be formed to protrude from one end of the lower portion of the display panel 1 having the button-shaped curved surface to one side. The connector area A41 may be formed at one end of the transmission area A40, for connection of the transmission area A40 to the external circuit board 2. In the connector area A41, one-side ends of first electrode patterns EP1 connected to lower electrodes 51 or one-side ends of second electrode patterns EP2 connected to upper electrodes 52 may be concentratedly disposed. A portion of the connector area A41, through which the plural electrode patterns EP1 or EP2 connected to the lower electrodes 51 or the upper electrode 52 extend, may also be included in the transmission area A40.

Figure 4:
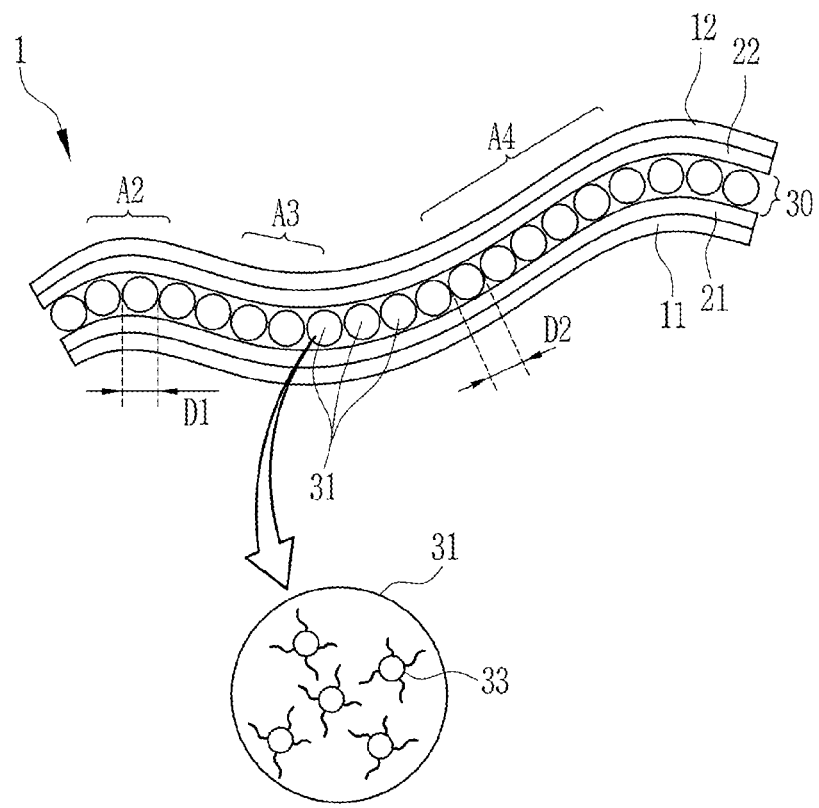
FIG. 4 is a sectional view of the display panel of the present disclosure configured in accordance with an embodiment.

FIG. 4 is a sectional view of the display panel 1 of the present disclosure configured in accordance with an embodiment. FIG. 4 shows a cross-section of the display panel 1 which has an irregularly curved shape. FIG. 4 shows a cross-section of a portion of the display area A10.

The display area A10 of the display panel 1 may include a first substrate 11, at least one first heat dissipation layer 21 formed on the first substrate 11, a capsule layer 30 disposed on the first heat dissipation layer 21 while including a plurality of capsules 31 representing a color, a second heat dissipation layer 22 formed on the capsule layer 30 and made of a transparent material, and a second substrate 21 formed on the second heat dissipation layer 22 and made of a transparent material. Each of the first substrate 11 and the second substrate 12 may include curved surfaces A2 and A3 formed at at least portions of each of the first substrate 11 and the second substrate 12 through thermoforming. The curved surfaces A2 and A3 may be included in a curved area.

The first substrate 11 may support the display panel 1. The second substrate 12 may be formed of a glass material having high hardness and a small thickness in order to protect the display panel 1. The first substrate 11 and the second substrate 12 may be formed to include a curved surface, through thermoforming. The first substrate 11 and the second substrate 12 may be made of a rigid or hard material capable of maintaining a curved surface shape formed through thermoforming. In the specification, the transparent material may mean a material having a property capable of transmitting light of a visible band therethrough. When the display panel 1 is configured to be observed at the side of the second substrate 12, the second heat dissipation layer 22 and the second substrate 12 may be made of a transparent material.

The first substrate 11 and the second substrate 12 may be made of a material selected from the group consisting of polydimethylsiloxane (PDMS), polyurethane (PU), polymethylmethacrylate (PMMA), polycarbonate, polyethylene, polypropylene, polystyrene, polyimide, cyclo-olefin copolymer (COC), parylene, and combinations thereof. The first substrate 11 and the second substrate 12 may be made of a material having stretchability, such as polydimethylsiloxane (PDMS) or polyurethane (PU), which is a flexible and stretchable material. The first substrate 11 and the second substrate 12 may be formed of a thermoformable film or a decorative film.

The first substrate 11 and the second substrate 12 may be formed of a thin glass having a thickness of 1 mm or less. The thin glass may be excellent in terms of barrier characteristics capable of blocking moisture or oxygen and, as such, a separate barrier layer may not be formed at the display panel 1. The thin glass exhibits high surface hardness and, as such, the display panel 1 may be used without a separate protection layer configured to protect the second substrate 12.

The display panel 1 may further include a first thermoforming film disposed at a lower surface of the first substrate 11 and configured to maintain a shape deformed through thermoforming, and a second thermoforming film disposed at an upper surface of the second substrate 12 and made of a transparent material while maintaining a shape deformed through thermoforming. The first thermoforming film or the second thermoforming film may be made of a material exhibiting high formability. In the specification, formability may mean characteristics enabling a material to maintain a deformed shape after being deformed through heating. The first thermoforming film or the second thermoforming film may supplement insufficient formability of the first substrate 11 and the second substrate 12 formed of a thin glass and as such, the first substrate 11 and the second substrate 12 may well maintain thermoformed curved surfaces.

The first heat dissipation layer 21 and the second heat dissipation layer 22 may be made of a material having high thermal conductivity. The first heat dissipation layer 21 and the second heat dissipation layer 22 may include a metal, an alloy, a metal oxide, a carbon-based material, or the like which has high thermal conductivity. Each of the first heat dissipation layer 21 and the second heat dissipation layer 22 may be formed to include a plurality of layers. The plurality of layers included in each of the first heat dissipation layer 21 and the second heat dissipation layer 22 may be made of different materials, respectively. The first heat dissipation layer 21 and the second heat dissipation layer 22 may include a metal layer, and a carbon-based material coated on the metal layer. When the first heat dissipation layer 21 and the second heat dissipation layer 22 use a metal and a carbon-based material in a composite manner, thermal conductivity thereof may be remarkably enhanced. The first heat dissipation layer 21 and the second heat dissipation layer 22, which additionally include a carbon-based material, may provide enhanced thermal diffusion performance, as compared to a heat dissipation layer made of a metal material. For example, a thermally conductive layer including a carbon-based material may form a metal oxide-carbon composite layer having a structure in which the carbon-based material is dispersed in a metal oxide matrix. The carbon-based material may include a carbon-based nanostructure. The carbon-based nanostructure is a nanoscale structure. For example, the carbon-based nanostructure may be a carbon nanotube, a carbon nanofiber, or the like. The carbon-based material may include graphite, expandable graphite, a carbon fiber, or the like. The metal oxide may additionally include at least one element selected from the group consisting of Ni, Co, Fe, Zn, Cr, Mo, W, V, Mn, Ti, and Sn. For example, the metal oxide may include at least one selected from the group consisting of nickel oxide, cobalt oxide, iron oxide, zinc oxide, chromium oxide, molybdenum oxide, tungsten oxide, vanadium oxide, manganese oxide, titanium oxide, and tin oxide. For example, the metal oxide may include an oxide and/or a hydroxide such as $Co_3O_4$, CoO (OH), CoO, NiO, $Ni_2O_3$, or $Ni(OH)_2$.

The capsule layer 30 may be disposed between the first heat dissipation layer 21 and the second heat dissipation layer 22. The capsule layer 30 may include a plurality of capsules 31. The capsule layer 30 may represent a color. Each capsule 31 of the capsule layer 30 may include quantum dots 33 or electrophoretic particles 32 therein. When each capsule 31 of the capsule layer 30 includes the quantum dots 33, the capsule layer 30 may represent a color in such a manner that the capsule layer 30 changes a wavelength of light input from the side of the first substrate 11, and then outputs the wavelength-changed light toward the second substrate 12. When each capsule 31 of the capsule layer 30 includes the electrophoretic particles 32, light input from the side of the second substrate 12 may be reflected by the electrophoretic particles 32, thereby emitting a color toward the second substrate 12.

The capsule 31 may be made of a flexible material and, as such, when the capsules 31 are deformed, the capsule 31 disposed in the curved area (A2 and A3 in FIG. 4) may have a greater diameter than that of the capsule 31 disposed in an area (A4 in FIG. 4) other than the curved areas (A2 and A3 in FIG. 4). When the capsules 31 are deformed in a state in which the display is formed to have a curved surface, the capsule 31 disposed in a curved area may have a diameter D1 greater than a diameter D2 of the capsule 31 disposed in an area other than the curved area or an area having a smaller curvature than that of the curved area. Each capsule 31 may have a varied diameter upon receiving heat and pressure in a thermoforming procedure. When pressure is applied to an area where a curved surface is formed, in a procedure of thermoforming the first substrate 11 and the second substrate 12, each capsule 31 made of a material having flexibility and stretchability may be deformed without being broken. When pressure is applied to the capsule 31, the capsule 31 may be deformed to have a decreased height and an increased diameter. For example, in FIG. 2, A2 is a convex curved surface, A3 is a concave curved surface, and the curved surfaces A2 and A3 are compositely interconnected. In FIG. 2, A4 is an area other than a curved surface, that is, a flat surface. When the capsules 31 are deformed, the capsules 31 disposed in the areas A2 and A3 may have the diameter D1 greater than the diameter D2 of the capsule 31 disposed in the area A4.

Each capsule 31 may include a plurality of quantum dots 33 dispersed by a solvent. The first heat dissipation layer 21 and the first substrate 11 may be made of a transparent material. As shown in FIG. 4, each quantum dot 33 may include a nanoscale metal particle, and an organic material tail connected to the metal particle. A light emitting diode (LED) panel (not shown), which generates light to be input to the quantum dot 33, may be disposed at a position where the LED panel outputs light toward the first substrate 11. The quantum dot 33 may convert a wavelength of light input thereto through the first substrate 11 in accordance with a size thereof, and may then output the resultant light toward the second substrate 12. For example, the quantum dot 33, which has a diameter of A nm, may convert a wavelength of light input thereto into a wavelength corresponding to red and may then output the resultant light, and the quantum dot 33, which has a diameter of B nm, may convert a wavelength of light input thereto into a wavelength corresponding to green and may then output the resultant light.

Figure 5:
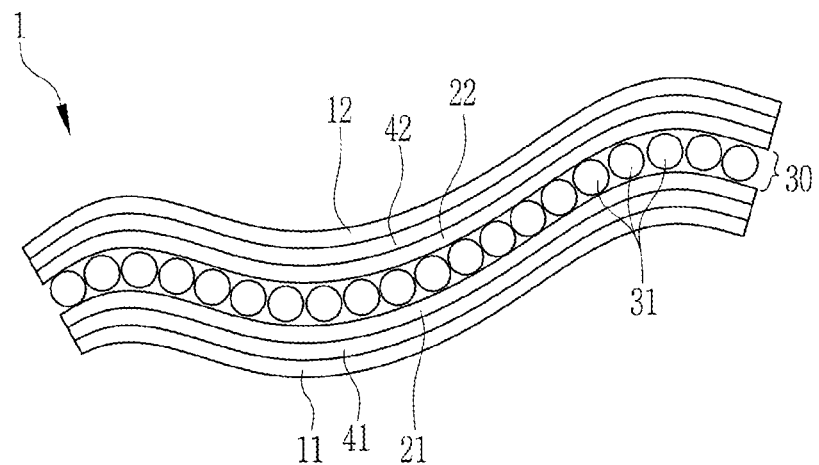
FIG. 5 is a sectional view of the display panel which further includes a heat blocking layer in accordance with an embodiment.

FIG. 5 is a sectional view of the display panel 1 which further includes a heat blocking layer in accordance with an embodiment.

The display panel 1 may further include a first heat blocking layer 41 formed between the first substrate 11 and the first heat dissipation layer 21 and made of a material having low thermal conductivity, and a second heat blocking layer 42 formed between the second heat dissipation layer 22 and the second substrate 12 and made of a material having low thermal conductivity. The first heat blocking layer 41 and the second heat blocking layer 42 may block, as much as possible, heat transferred from the first substrate 11 and the second substrate 12 to the first heat dissipation layer 21 and the second heat dissipation layer 22.

In the thermoforming procedure, heat is applied to the first substrate 11 and the second substrate 12. In this case, when the first heat dissipation layer 21 directly contacts the first substrate 11, the first heat dissipation layer 21 outwardly dissipates heat transferred to the first substrate 11 and, as such, it may be difficult for the first substrate 11 to reach a temperature required for thermoforming thereof. Otherwise, heat transferred to the first substrate 11 may be transferred to the capsule layer 30 via the first heat dissipation layer 21 and, as such, the capsule layer 30 may be excessively heated. That is, when the heat dissipation layer and the substrate directly contact each other, it may be difficult for the substrate to reach a temperature for thermoforming thereof, or the capsule 31 may be excessively heated.

Of course, both heat dissipation and thermoforming may be achieved only using the heat dissipation layer in accordance with the temperature required for thermoforming of the substrate, the thermal conductivity of the heat dissipation layer, and the temperature at which the capsule 31 is broken. However, when the first heat blocking layer 41 is disposed between the first substrate 11 and the first heat dissipation layer 21, the first heat blocking layer 41 blocks a part of heat transferred from the first substrate 11 to the first heat dissipation layer 21 and, as such, the heat dissipation function of the first heat dissipation layer 21 may be more effectively achieved, and the temperature of the capsule 31 may be maintained at a further lowered level. In addition, the first substrate 11 may use a material requiring a relatively higher thermoforming temperature. The same effects and the same conditions as those in the above-described case may be given in the case in which the second heat blocking layer 42 is formed between the second substrate 12 and the second heat dissipation layer 22. The display panel 1 may include one or both of the first heat blocking layer 41 and the second heat blocking layer 42.

Figure 16:
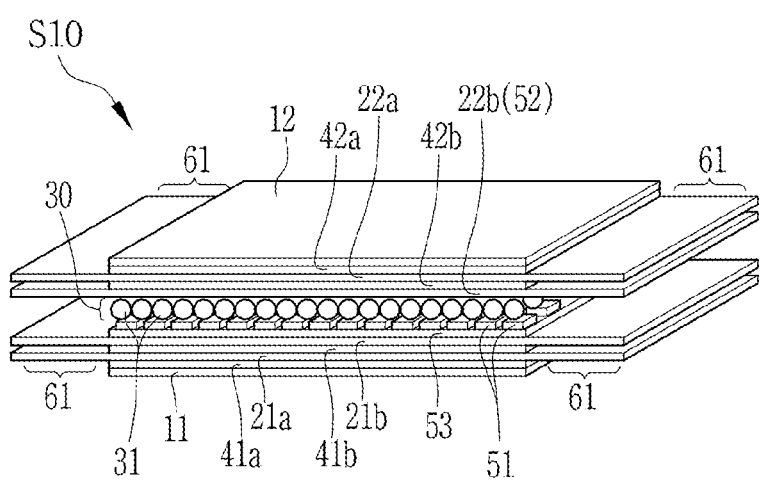
FIG. 16 is a view showing a structure obtained after heat blocking layers and heat dissipation layers are repeatedly formed in forming the flat display panel in accordance with an embodiment.

Each of the first heat blocking layer 41, the second heat blocking layer 42, the first heat dissipation layer 21, and the second heat dissipation layer 22 may be formed in plural. For example, as shown in FIG. 16, the display panel 1 may be formed through sequential stacking of a first substrate 11, a 1-1-th heat blocking layer 41a, a 1-1-th heat dissipation layer 21a, a 1-2-th heat blocking layer 41b, a 1-2-th heat dissipation layer 21b, a capsule layer 30, a 2-2-th heat dissipation layer 22b, a 2-2-th heat blocking layer 42b, a 2-1-th heat dissipation layer 22a, a 2-1-th heat blocking layer 42a, and a second substrate 12 in this order. When heat blocking layers and heat dissipation layers are repeatedly stacked, it may be possible to outwardly dissipate, as much as possible, heat transferred from the substrates to the capsule layer 30. The 1-1-th heat blocking layer 41a may block heat transferred from the first substrate 11 to the 1-1-th heat dissipation layer 21a, the 1-1-th heat dissipation layer 21a may dissipate heat outwards, the 1-2-th heat blocking layer 41b may block heat transferred from the 1-1-th heat dissipation layer 21a to the 1-2-th heat dissipation layer 21b, and the 1-2-th heat dissipation layer 21b may again dissipate heat outwards. Accordingly, when the difference between the thermoforming temperature of the substrates and the breakage limit temperature of the capsule 31 is great, thermoforming of the substrates may be achieved without breakage of the capsule layer 30 through repeated formation of heat blocking layers and heat dissipation layers.

Figure 6:
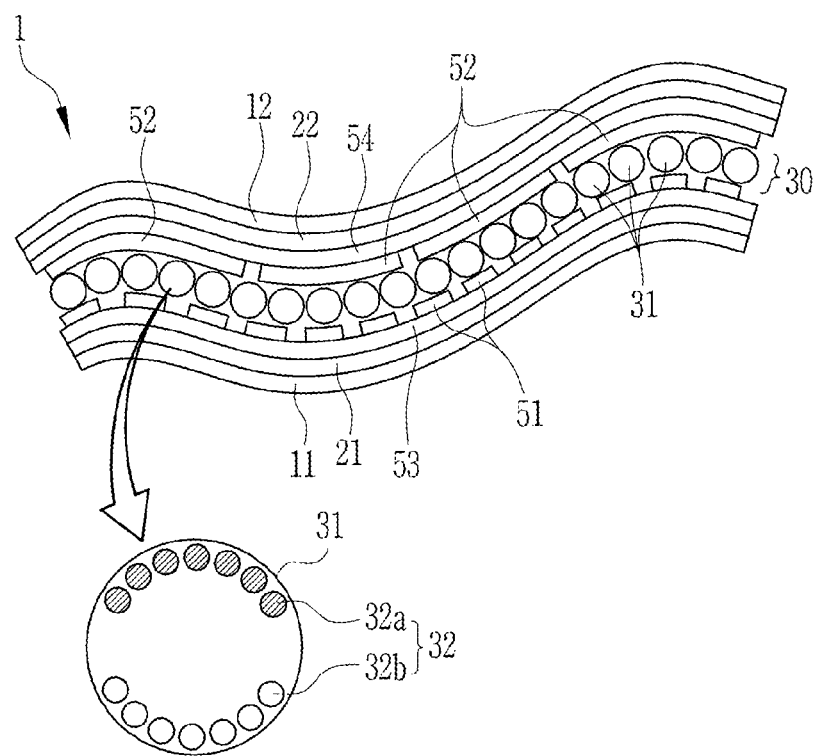
FIG. 6 is a sectional view of the display panel which further includes a lower electrode and an upper electrode in accordance with an embodiment.

FIG. 6 is a sectional view of the display panel 1 which further includes a lower electrode 51 and an upper electrode 52 in accordance with an embodiment.

The display panel 1 may further include a plurality of lower electrodes 51 formed between the first heat dissipation layer 21 and the capsule layer 30 while being spaced apart from one another, and one upper electrode 52 or a plurality of spaced upper electrodes 52 formed between the capsule layer 30 and the second heat dissipation layer 22 and made of a transparent material having electrical conductivity. In this case, each capsule 31 may include a plurality of electrophoretic particles 32 movable by an electric field formed between the lower electrodes 51 and the upper electrode or electrodes 52 in accordance with a pixel control signal. The electrophoretic particles 32 may be contained in the capsule 31 in a state of being dispersed by a solvent. The display panel 1 may further include a first insulating layer 53 formed between the first heat dissipation layer 21 and the lower electrode 51 and made of an electrical insulating material, and a second insulating layer 54 formed between the second heat dissipation layer 22 and the upper electrode 52 and made of an electrical insulating material.

The display panel 1 may be formed through sequential stacking of the first substrate 11, the first heat dissipation layer 21, the first insulating layer 53, the lower electrodes 51, the capsule layer 30, the upper electrode 52, the second insulating layer 54, the second heat dissipation layer 22, and the second substrate 12 in this order. When the first heat dissipation layer 21 and the second heat dissipation layer 22 are made of an electrical insulating material, the first insulating layer 53 and the second insulating layer 54 may be omitted. The first insulating layer 53 and the second insulating layer 54 may be formed to insulate the first heat dissipation layer 21 and the second heat dissipation layer 22 made of a material having electrical conductivity from the lower electrode 51 or the upper electrode 52. The first insulating layer 53 and the second insulating layer 54 may prevent a pixel control signal applied to the lower electrode 51 or the upper electrode 52 from leaking through the first heat dissipation layer 21 or the second heat dissipation layer 22.

Each capsule 31 may include electrophoretic particles 32. The electrophoretic particles 32 may include a first particle 32a having a first color and a second particle 32b having a second color. The electrophoretic particles 32 may further include a third particle having a third color, and a fourth particle or other particles having other colors. The electrophoretic particles 32 may be movable toward the upper electrode 52 or the lower electrode 51 in accordance with an electric field formed by the upper electrode 52 or the lower electrode 51. Particles moved toward the upper electrode 52 may be externally observed at the side of the second substrate 12. Light incident upon the capsule 31 from the side of the second substrate 12 may be reflected by the electrophoretic particles 32 moved toward the upper electrode 52 and, as such, may represent a color. Accordingly, the first substrate 11, the first heat dissipation layer 21, the first insulating layer 53, and the lower electrode 51 may not be made of a transparent material, whereas the upper electrode 52, the second insulating layer 54, the second heat dissipation layer 22, and the second substrate 12 may be made of a transparent material.

Since the first heat dissipation layer 21 may not be made of a transparent material, various materials having high heat dissipation performance may be selected for the first heat dissipation layer 21. For example, the first heat dissipation layer 21 may be a metal layer, or may include a plurality of thermally conductive layers made of different materials. The first heat dissipation layer 21 may be thickly formed to achieve an enhancement in the heat dissipation function thereof.

The lower electrode 51 may be formed in plural under the capsule layer 30. In this case, the plurality of lower electrodes 51 may be formed to be spaced apart from one another. The upper electrode 52 may be formed in single or in plural over the capsule layer 30. When a plurality of upper electrodes 52 is formed, the upper electrodes 52 may be formed to be spaced apart from one another. The upper electrode 52 may be formed as a single continuous electrode. The area of the upper electrode 52 may be greater than the area of the lower electrode 51. A pixel control signal may be applied to the lower electrode 51 and the upper electrode 52 such that the potential of the lower electrode 51 is a positive (+) or negative (−) potential with reference to that of the upper electrode 52. In this case, the lower electrode 51, which has a smaller size than that of the upper electrode 52, may correspond to one pixel.

An insulating material may be formed between adjacent ones of the lower electrodes 51, between adjacent ones of the upper electrodes 52, between the upper electrodes 52 and the lower electrodes 51, and between adjacent ones of the capsules 31. The insulating material may insulate the upper electrodes 52 and the lower electrodes 51 from each other in order to enable an electric field between the upper electrodes 52 and the lower electrodes 51. The insulating material may perform a binder function for fixing the plurality of capsules 31. The insulating material filled between the adjacent lower electrodes 51, the insulating material filled between the adjacent upper electrodes 52, and the insulating material filled between the adjacent capsules 31 may be different form one another.

Figure 7:
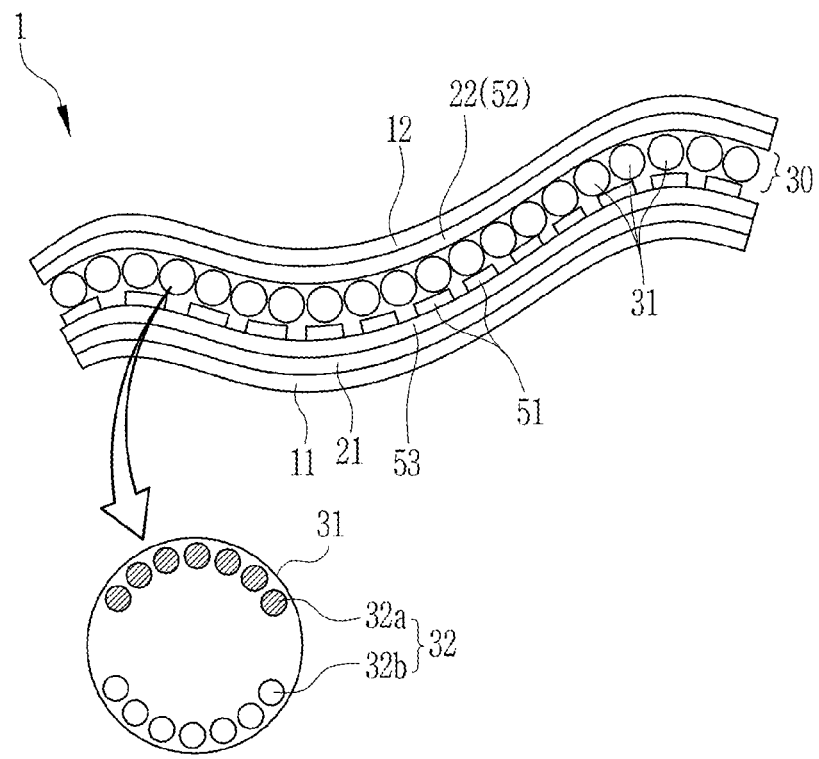
FIG. 7 is a sectional view of the display panel which further includes a continuous upper electrode in accordance with an embodiment.

FIG. 7 is a sectional view of the display panel 1 which further includes a continuous upper electrode 52 in accordance with an embodiment.

The display panel 1 may further include a first insulating layer 53 formed between the first heat dissipation layer 21 and the lower electrode 51 and made of an electrical insulating material. The second heat dissipation layer 22 and the upper electrode 52 may be formed as a single continuous layer. In this case, the second insulating layer 54 is unnecessary because the second heat dissipation layer 22 and the upper electrode 52 are formed as a single continuous layer.

The second heat dissipation layer 22 may be made of a material having electrical conductivity and may be formed as a single continuous layer. In this case, the second heat dissipation layer 22 may have the same function as that of the upper electrode 52. That is, the second heat dissipation layer 22 and the upper electrode 52 may be the same layer.

The second heat dissipation layer 22 may be wholly formed as a single continuous layer in order to outwardly dissipate heat transferred thereto via the second substrate 12. A pixel control signal may be controlled such that the potential of the plurality of lower electrodes 51 is a positive (+) or negative (−) potential with reference to that of the upper electrode 52. Accordingly, it may be possible to control the color of each pixel even though the upper electrode 52 is formed as a single continuous layer.

When the upper electrode 52 is formed in plural such that the plurality of upper electrodes 52 is spaced apart from one another, as shown in FIG. 6, heat transfer becomes difficult because the upper electrodes 52 are spaced apart from one another. To this end, a separate heat dissipation layer 22 is necessary in association with the upper electrodes 52. On the other hand, when the upper electrode 52 is formed as a single continuous layer, as shown in FIG. 7, heat transfer may be easy because the upper electrode 52 is continuous. Accordingly, the second heat dissipation layer 22 is unnecessary in association with the upper electrode 52.

Of course, even though the upper electrode 52 is formed in plural such that the plurality of upper electrodes 52 is spaced apart from one another, as shown in FIG. 6, it may be possible to dissipate heat through the upper electrodes 52 when each upper electrode 52 is very larger than each lower electrode 51, and one-side ends of the upper electrodes 52 extends to an edge of the display panel 1. In this case, accordingly, the second heat dissipation layer 22 may be unnecessary.

In the cases of FIGS. 6 and 7, the lower electrodes 51 may be formed to be spaced apart from one another because the first heat dissipation layer 21 may outwardly dissipate heat transferred thereto from the first substrate 11.

Meanwhile, the display panel 1 may have a modified structure capable of emitting a color toward the first substrate 11, differently from the above-described structure in which the display panel 1 emits a color toward the second substrate 12. For example, the first substrate 11, the first heat dissipation layer 21, the first insulating layer 53, and the lower electrode 51 may be made of a material transparent to visible light, whereas the second substrate 12, the second heat dissipation layer 22, the second insulating layer 54, and the upper electrode 52 may be formed of a material not transparent to visible light.

Figure 8:
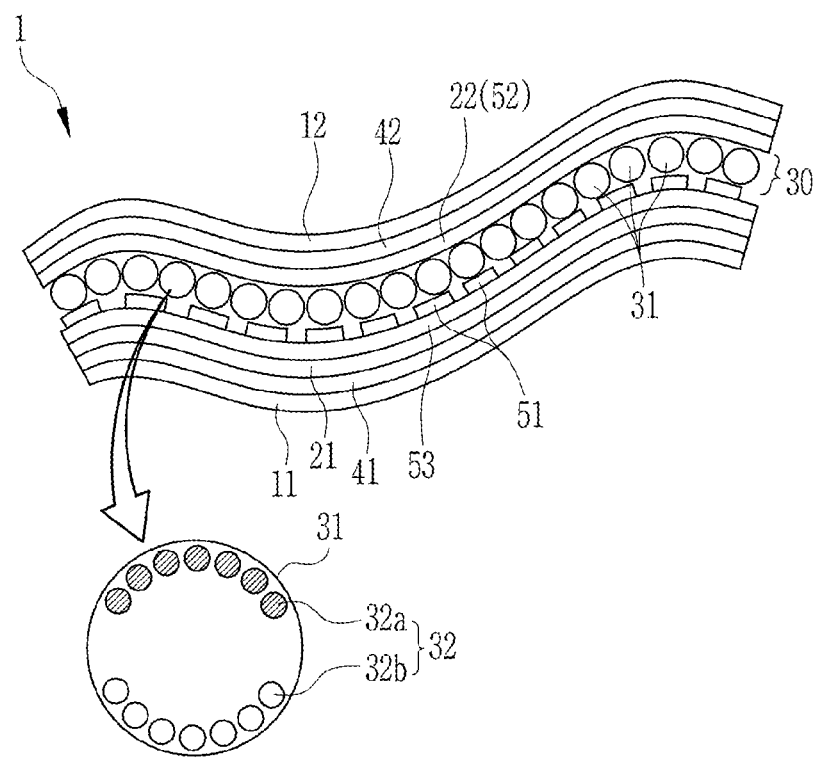
FIG. 8 is a sectional view of the display panel 1 which further includes a lower electrode, an upper electrode, and a heat blocking layer.

FIG. 8 is a sectional view of the display panel 1 which further includes a lower electrode 51, an upper electrode 52, and a heat blocking layer.

The display panel 1 may be formed through sequential stacking of a first substrate 11, a first heat blocking layer 41, a first heat dissipation layer 21, a first insulating layer 53, a lower electrode 51, a capsule layer 30, a second heat dissipation layer 22 (an upper electrode 52), a second heat blocking layer 42, and a second substrate 12 in this order. Contents overlapping with the contents described with reference to FIGS. 5, 6, and 7 are omitted. In a procedure of thermoforming a curved area A30, heat applied to the first substrate 11 may be blocked by the first heat blocking layer 41, and heat applied to the first heat dissipation layer 21 after passing through the first heat blocking layer 41 may be outwardly dissipated from the first heat dissipation layer 21 and, as such, heat transferred to the capsule layer 30 may be minimized. Similarly, heat applied to the second substrate 12 may be blocked by the second heat blocking layer 42, and heat applied to the second heat dissipation layer 22 after passing through the second heat blocking layer 42 may be outwardly dissipated from the second heat dissipation layer 22 and, as such, heat transferred to the capsule layer 30 may be minimize.

Figure 9:
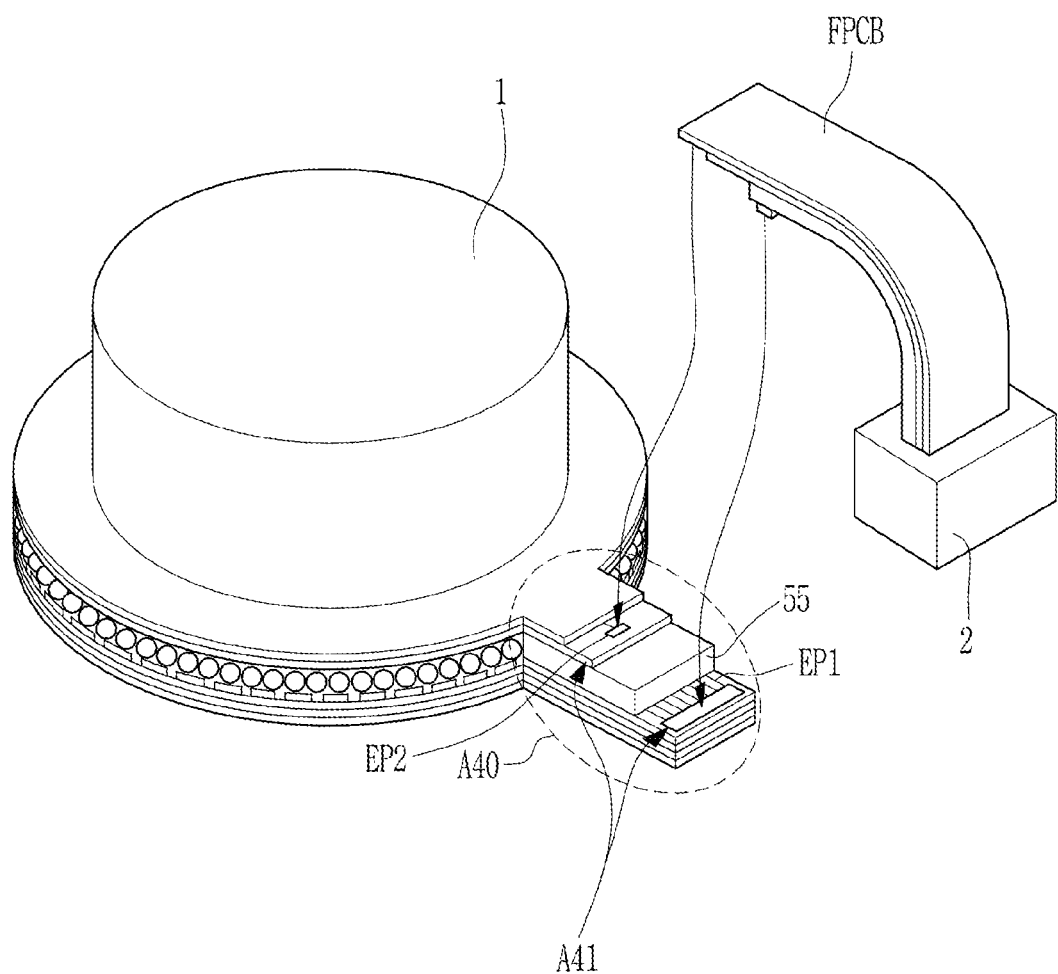
FIG. 9 is a view explaining connection between the display panel and a circuit board according to an embodiment.

FIG. 9 is a view explaining connection between the display panel 1 and the circuit board 2 according to an embodiment.

The circuit board 2 may be connected to the display panel 1 and, as such, may provide a pixel control signal to the lower electrode 51 and the upper electrode 52. The circuit board 2 and the display panel 1 may be interconnected via a flexible printed circuit board (FPCB) or may be directly interconnected. The pixel control signal output from the circuit board 2 may be transmitted to the lower electrode 51 or the upper electrode 52 via an electrode pattern of the transmission area A40. The pixel control signal may form an electric field between the lower electrode 51 and the upper electrode 52, thereby moving the electrophoretic particles 32 included in the capsules 31.

The circuit board 2 may generate a control signal according to active matrix driving, passive matrix driving, or segment driving in accordance with structures of the upper electrode 52 and the lower electrode 51. Since a structure in which the upper electrode 52 is formed as a single continuous layer, a plurality of lower electrodes 51 is formed to be spaced apart from one another, and electrode patterns are connected to the plurality of lower electrodes 51, respectively, is associated with segment driving, the circuit board 2 may generate a control signal for driving each pixel in this structure. In a structure in which a plurality of spaced upper electrodes 52 is formed between the second heat dissipation layer 22 and the capsule layer 30, the circuit board 2 may generate a control signal according to active matrix driving or passive matrix driving. The circuit board 2 may be controlled by a control device of a vehicle or a home electronic appliance.

The transmission area A40 of the display panel 1 may include a plurality of first electrode patterns EP1 connected to the lower electrodes 51, one second electrode pattern EP2 or a plurality of second electrode patterns EP2 connected to the upper electrode 52 or the upper electrodes 52, and a third insulating layer 55 configured to insulate the first electrode patterns EP1 and the second electrode patterns EP2. The third insulating layer 55 may be formed at the same layer as the capsule layer 30. The first electrode patterns EP1 and the second electrode patterns EP2 may be concentrated in the connector area A41 at one-side ends thereof, so as to be connected to the circuit board 2 configured to output the pixel control signal.

The first electrode patterns EP1 may be connected to the plurality of lower electrodes 51, respectively. The first electrode patterns EP1 may be formed at the same layer as the lower electrodes 51 or at a layer under the lower electrodes 51. One-side ends of the first electrode patterns EP1 may be disposed to be concentrated in the connector area A41. One-side ends of the first electrode patterns EP1 may be electrically connected to a connector (for example, an FPCB) connected to the connector area A41.

The second electrode patterns EP2 may be connected to one upper electrode 52 or may be connected to the plurality of upper electrodes 52, respectively. The second electrode patterns EP2 may be formed at the same layer as the upper electrode or electrodes 52 or at a layer over the upper electrode or electrodes 52. One-side ends of the second electrode patterns EP2 may be disposed to be concentrated in the connector area A41. One-side ends of the second electrode patterns EP2 may be electrically connected to the connector connected to the connector area A41.

The third insulating layer 55 may be formed between a layer at which the first electrode patterns EP1 are formed and a layer at which the second electrode patterns EP2 are formed. The third insulating layer 55 may be formed at the same layer as the capsule layer 30. The third insulating layer 55 may also be formed in an area other than the display area A10. The third insulating layer 55 may be formed in the spare area A20 or the transmission area A40, in place of the capsule layer 30.

In the connector area A41 of the display panel 1, the second substrate 12 may be formed to expose one-side ends of the second electrode patterns EP2 connected to the upper electrode or electrodes 52. The second substrate 12, the upper electrode or electrodes 52, and the capsule layer 30 may be formed to expose one-side ends of the first electrode patterns EP1 connected to the lower electrodes 51. The connector interconnecting the circuit board 2 and the connector area A41 may be formed to be divided into an area where the connector is connected to the first electrode patterns EP1 and an area where the connector is connected to the second electrode patterns EP2. Detailed structures for exposing one-side ends of the first electrode patterns EP1 and one-side ends of the second electrode patterns EP2 in the connector area A41 of the display panel 1 may be diverse.

Generally, a display panel is formed to have a quadrangular shape. This is because a quadrangular panel may be conveniently handled in a manufacturing process. On the other hand, the display panel 1 of the present disclosure may be formed to have various shapes. For example, the display panel 1 shown in FIG. 9 may have a circular shape at an edge of the spare area A20. The display panel 1 of FIG. 9 is formed to have a desired shape through removal of a portion thereof other than the display area A10, the transmission area A40, and the spare area A20.

Figure 10:
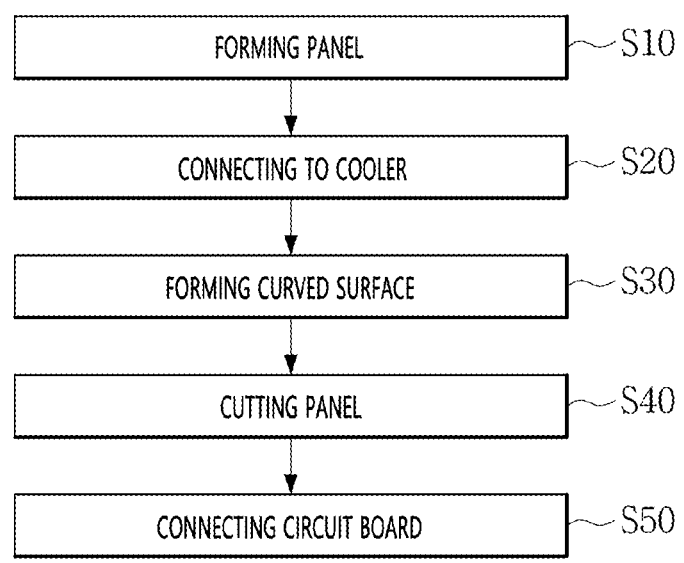
FIG. 10 is a flowchart showing a method of manufacturing the display panel of the disclosure in accordance with an embodiment.
Figure 11:
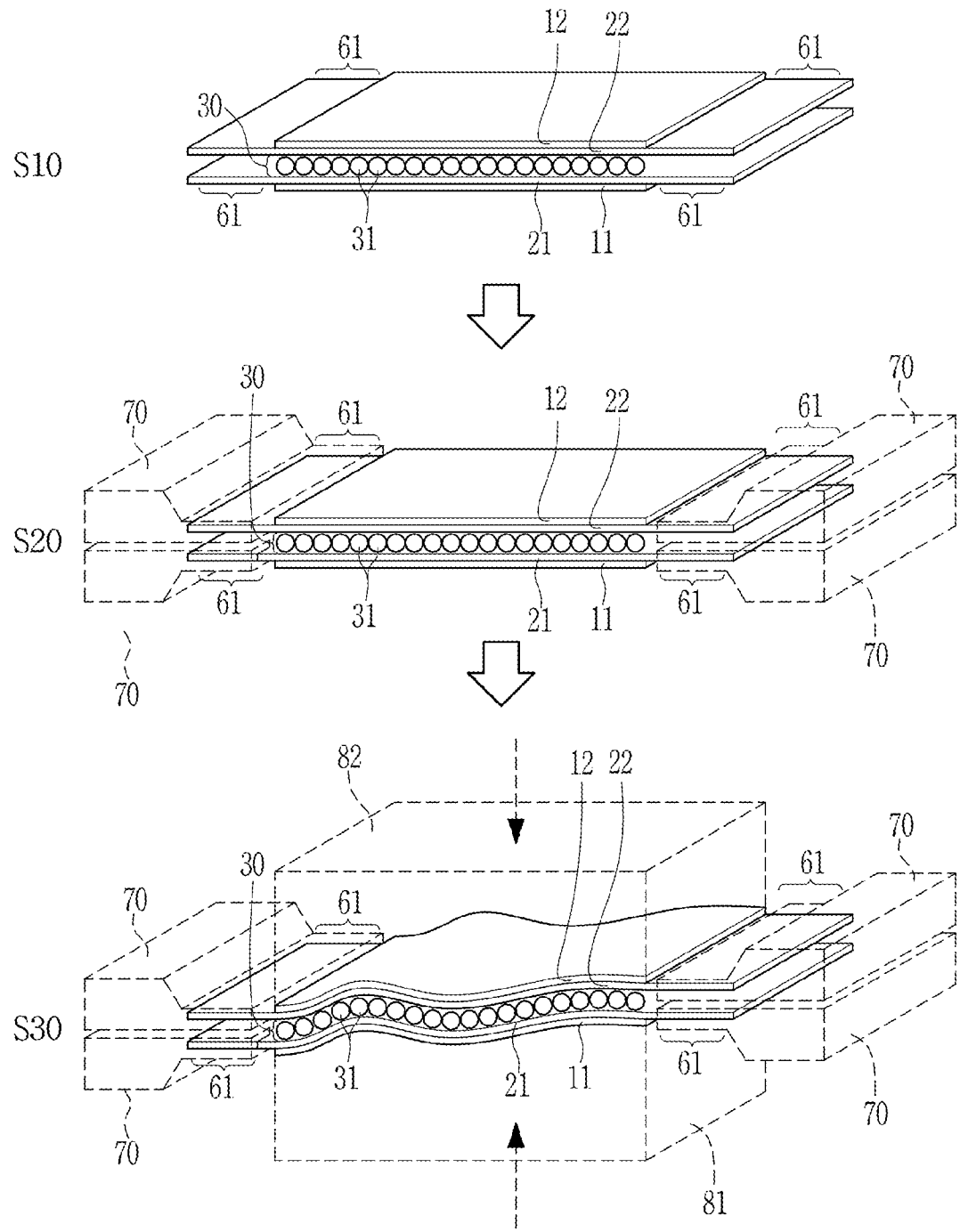
FIGS. 11 and 12 are views showing steps of the method of manufacturing the display panel of the disclosure in accordance with the embodiment.
Figure 12:
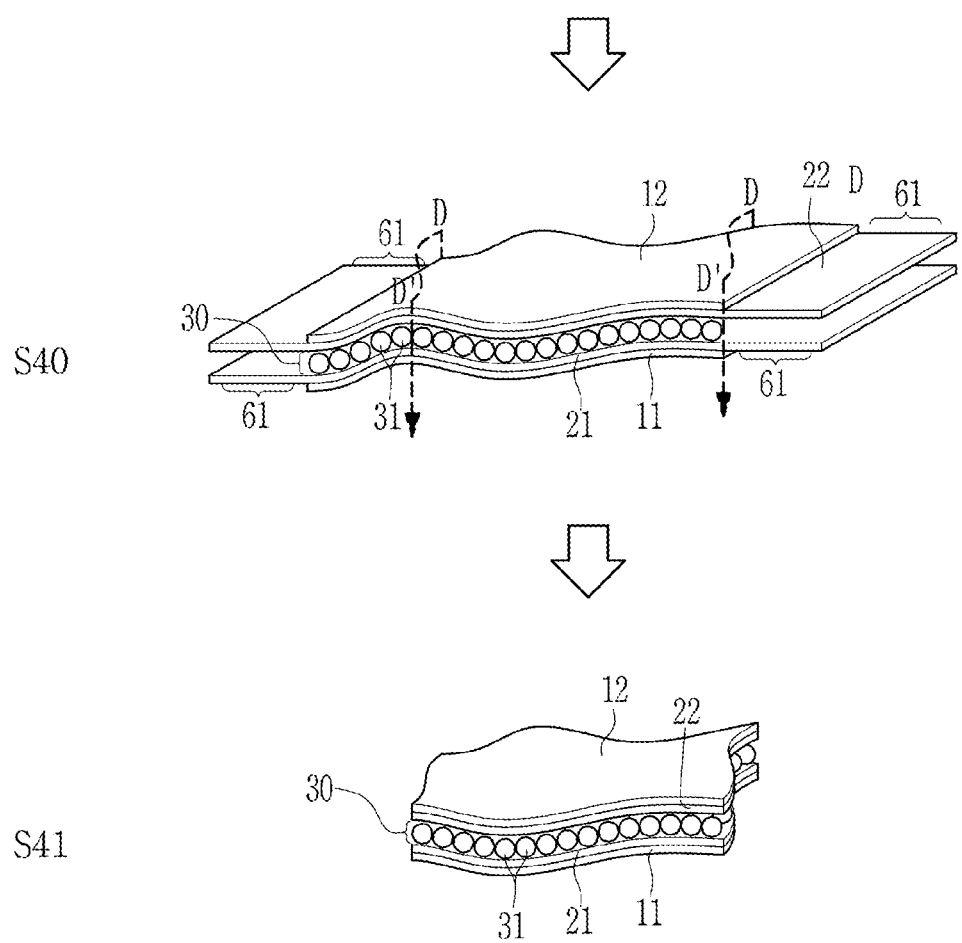

FIG. 10 is a flowchart showing a method of manufacturing the display panel 1 of the disclosure in accordance with an embodiment. FIGS. 11 and 12 are views showing steps of the method of manufacturing the display panel 1 of the disclosure in accordance with the embodiment. FIGS. 11 and 12 are continuous views. The following description will be given with reference to FIGS. 10, 11, and 12.

The method of manufacturing the display panel 1 may include forming a flat display panel including a display area A10 configured to display an image through stacking of a first substrate 11, a first heat dissipation layer 21, a capsule layer 30, a second heat dissipation layer 22, and a second substrate 12 (S10), connecting the first heat dissipation layer 21 and the second heat dissipation layer 22 to a cooler 70 (S20), and forming a curved surface at a part or the entirety of the display area A10 through application of heat to the first substrate 11 and the second substrate 12 (S30). In forming the curved surface (S30), heat transferred to a capsule 31 may be dissipated to the cooler 70 via the first heat dissipation layer 21 or the second heat dissipation layer 22.

The method of manufacturing the display panel 1 may further include cutting a portion of the display panel 1 corresponding to a removal area A50, except for the display area A10 configured to display an image, a transmission area A40 configured to transmit a pixel control signal to the display area A10, and a spare area A20 surrounding the display area A10 and the transmission area A40 (S40).

The method of manufacturing the display panel 1 may further include connecting, to the display panel 1, a circuit board 2 configured to provide a pixel control signal to a lower electrode 51 and an upper electrode 52 (S50).

The display panel 1 may be formed using a thermoforming method. The thermoforming method is a method of forming the display panel 1 to have a flat structure, and then pressing the display panel 1 to have a desired shape while applying heat to the display panel 1, thereby forming a curved surface at the display panel 1. When excessive heat is applied to the capsule 31 in a thermoforming procedure, the capsule 31 may be broken, or a solvent, an electrophoretic particle 32, a quantum dot 33, etc. included in the capsule 31 may be broken. In accordance with the present disclosure, heat transferred to the capsule 31 may be outwardly dissipated using the first heat dissipation layer 21 or the second heat dissipation layer 22 in order to prevent breakage of the capsule 31. Accordingly, even when the first substrate 11 and the second substrate 12 are deformed by heat, the capsule 31 may not be broken.

The forming a flat display panel (S10) is a procedure for forming the display panel 1 to have a flat structure. In forming the flat display panel (S10), the display panel 1 may be formed by sequentially stacking the first substrate 11, the first heat dissipation layer 21, the capsule layer 30, the second heat dissipation layer 22, and the second substrate 12 in this order in an area to be formed into the display area A10. In forming the flat display panel (S10), a third insulating layer 55 may be formed in an area to be formed into the spare area A20 and an area to be formed into the transmission area A40, in place of the capsule layer 30. The forming a flat display panel (S10) may be carried out through an existing quantum dot display manufacturing method or an existing electrophoretic display manufacturing method.

In forming the flat display panel (S10), the first heat dissipation layer 21 or the second heat dissipation layer 22, each of which is wider than the display panel 1, may be stacked such that at least a portion of the first heat dissipation layer 21 or the second heat dissipation layer 22 may protrude outside the display panel 1, thereby forming a heat dissipation path 61, That is, in forming the flat display panel (S10), the first heat dissipation layer 21 or the second heat dissipation layer 22 may be formed to be wider than the display panel 1.

A portion of the first heat dissipation layer 21 or a portion of the second heat dissipation layer 22 disposed outside the display panel 1 in accordance with formation of the first heat dissipation layer 21 or the second heat dissipation layer 22 to be wider than the flat display panel 1, for connection to the cooler 70, may be referred to as a "heat dissipation path 61". The heat dissipation path 61 is a path for dissipating heat from the first heat dissipation layer 21 or the second heat dissipation layer 22 to the cooler 70. In order to form the first heat dissipation layer 21 or the second heat dissipation layer 22 to be wider than an area to be formed as a display, a method, in which the first heat dissipation layer 21 or the second heat dissipation layer 22 is formed in the form of a film, and is then bonded to the display panel 1, may be used.

The connection to a cooler 70 (S20) is a procedure for connecting the heat dissipation path 61 of the first heat dissipation layer 21 or the heat dissipation path 61 of the second heat dissipation layer 22 to the cooler 70. In the connection to a cooler 70 (S20), the cooler 70 may be connected to the first heat dissipation layer 21 or the second heat dissipation layer 22, or may be connected to both the first heat dissipation layer 21 and the second heat dissipation layer 22. A plurality of coolers 70 may be connected to one heat dissipation layer. The cooler 70 may be connected to the heat dissipation path 61 of the first heat dissipation layer 21 and the heat dissipation path 61 of the second heat dissipation layer 22 protruding outside the flat display panel 1. The cooler 70 is a device configured to absorb heat from a heat dissipation layer. The cooler 70 may have various structures such as an air-cooled type structure, a water-cooled type structure, a structure using a cryogenic material, etc. The cooler 70 may be maintained at a lower temperature than that of the first heat dissipation layer 21 or the second heat dissipation layer 22 and, as such, may absorb heat from the first heat dissipation layer or the second heat dissipation layer 22. The cooler 70 may be physically connected to the first heat dissipation layer 21 or the second heat dissipation layer 22, to absorb heat from the first heat dissipation layer 21 or the second heat dissipation layer 22, thereby preventing heat from being transferred from the first heat dissipation layer 21 or the second heat dissipation layer 22 to the capsule layer 30.

The forming a curved surface (S30) is a procedure for thermoforming the flat display panel 1 connected to the cooler 70. In forming the curved surface (S30), a portion of the flat display panel 1 to be formed into a curved area A30 may be heated and pressed using a first mold 81 and a second mold 82, which are formed to have a predetermined curved surface shape, and, as such, the first substrate 11 and the second substrate 12 may be thermoformed.

The thermoforming device may include the first mold 81 and the second mold 82. The first mold 81 and the second mold 82 may apply heat to the first substrate 11 and the second substrate 12, respectively. Each of the first mold 81 and the second mold 82 has a structure formed with a curved surface. When the first mold 81 and the second mold 82 press the flat display panel 1 while applying heat to the flat display panel 1 under the condition that the first mold 81 is disposed at the side of the first substrate 11, and the second mold 82 is disposed at the side of the second substrate 12, the first substrate 11 and the second substrate 12 may be heated and, as such, may be deformed along the curved surfaces formed at the first mold 81 and the second mold 82.

In this state, the cooler 70 may absorb heat from the first heat dissipation layer 21 and the second heat dissipation layer 22. Since heat applied to the first substrate 11 by the first mold 81 is transferred to the cooler 70 via the first heat dissipation layer 21, the capsule layer 30 may not be broken by heat. Similarly, heat applied to the second substrate 12 by the second mold 82 may be transferred to the cooler 70 via the second heat dissipation layer 22 and, as such, the capsule layer 30 may not be broken by heat. The first substrate 11 may be molded in accordance with the shape of the first mold 81, and the second substrate 12 may be molded in accordance with the shape of the second mold 82. When the first substrate 11 and the second substrate 12 are deformed, the first mold 81 and the second mold 82 may then be removed from the display panel 1. When the thermoforming device is removed, the first substrate 11 and the second substrate 12 may be maintained in a thermoformed state.

The cutting a portion of the display panel 1 is a procedure for removing an unnecessary portion of the display panel 1 thermoformed to have a curved surface. Here, the unnecessary portion means a portion of the display panel 1, except for the display area A10, the transmission area A40, and the spare area A20, that is, a removal area A50. The removal area A50 may include the heat dissipation path 61 and a heat transfer path 62 (cf. FIG. 14) not required to be included in the display panel 1. The removal area A50 may include a portion of the display panel 1 corresponding to an area outside a boundary defined by edges of the display area A10, the transmission area A40, and the spare area A20. As shown in FIG. 12, the boundary, which is designated by "D-D", may be defined to have a curved line shape.

In the method of manufacturing the display panel 1 in accordance with the embodiment, the first heat dissipation layer 21 and the second heat dissipation layer 22 are formed to be wider than the display panel 1 in forming the flat display panel (S10), heat is dissipated through the heat dissipation layers in the thermoforming procedure, and an unnecessary portion of the display panel 1 is removed after completion of the thermoforming procedure. The display panel 1, which has a curved surface after cutting thereof, is shown by "S41" in FIG. 12.

The connecting a circuit board 2 is a procedure for connecting, to the display panel 1, the circuit board 2 configured to drive the display panel 1. Connecting the circuit board 2 may be performed after the cutting a portion of the display panel 1 (S40). When connecting the circuit board 2 is performed, connection between the display panel 1 and the circuit board 2 may be achieved. In connecting the circuit board 2, the circuit board 2 may be connected to a plurality of display panels 1 in order to control the plurality of display panels 1. The display panels may be interconnected using an FPCB or the like. Connecting the circuit board 2 may also be performed after the display panel is mounted to a product.

Figure 13:
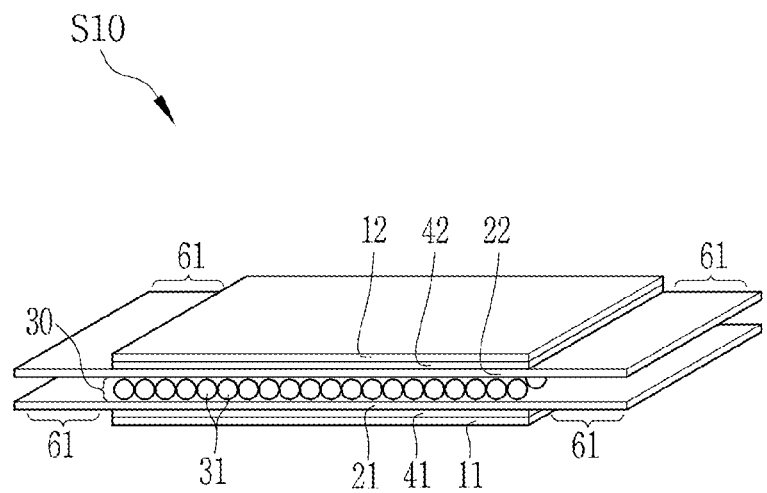
FIG. 13 is a view showing a structure obtained after a heat blocking layer is further formed in forming a flat display panel in accordance with an embodiment.

FIG. 13 is a view showing a structure obtained after a heat blocking layer is further formed in forming the flat display panel (S10) in accordance with an embodiment.

As described above, in forming the flat display panel (S10), the first substrate 11, the first heat dissipation layer 21, the capsule layer 30, the second heat dissipation layer 22, and the second substrate 12 may be formed. The first heat dissipation layer 21 and the second heat dissipation layer 22 may be widely formed to extend to outside of a boundary of the flat display panel 1. In forming the flat display panel (S10), a first heat blocking layer 41 made of a material having low thermal conductivity may be further formed between the first substrate 11 and the first heat dissipation layer 21, and a second heat blocking layer 42 made of a material having low thermal conductivity may be further formed between the second heat dissipation layer 22 and the second substrate 12. The heat blocking layer may be sufficient when the heat blocking layer prevents heat from being transferred to the heat dissipation layer. Accordingly, the first heat blocking layer 41 may be formed to have an area equal to or greater than that of the first substrate 11, and the second heat blocking layer 42 may be formed to have an area equal to or greater than that of the second substrate 12. The heat blocking layer may be formed to have a smaller area than that of the heat dissipation layer such that the contact area between the cooler 70 and the heat dissipation layer may be maximized. In this case, when the cooler 70 is coupled to the heat dissipation layer, the cooler 70 may be coupled to both an upper surface and a lower surface of the heat dissipation layer and, as such, heat dissipation efficiency may be enhanced in accordance with an increase in contact area. After execution of the forming a flat display panel (S10) shown in FIG. 13, the connection to a cooler 70 (S20), the forming a curved surface (S30), and the cutting a portion of the display panel (S40), which have been described with reference to FIGS. 11 and 12, may be continuously performed.

Figure 14:
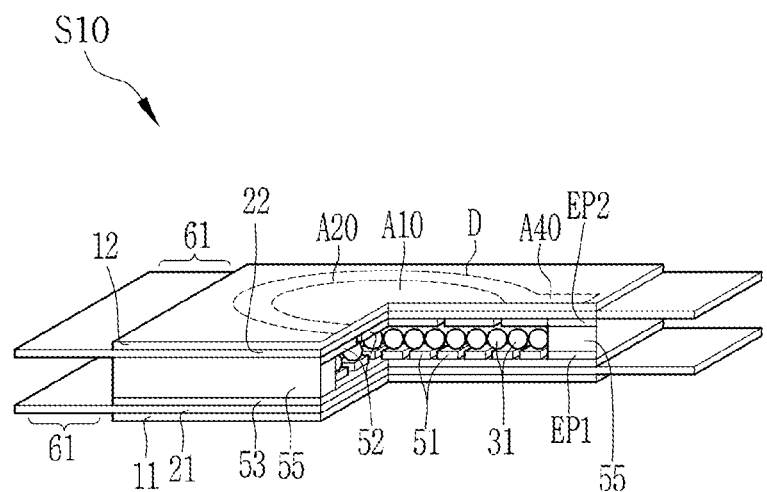
FIG. 14 is a view showing a structure obtained after a lower electrode and an upper electrode are further formed in forming the flat display panel in accordance with an embodiment.

FIG. 14 is a view showing a structure obtained after the lower electrode 51 and the upper electrode 52 are further formed in forming the flat display panel (S10) in accordance with an embodiment. FIG. 14 also shows a cross-section of a cut-out portion of the flat display panel.

As described above, in forming the flat display panel (S10), the first substrate 11, the first heat dissipation layer 21, the capsule layer 30, the second heat dissipation layer 22, and the second substrate 12 may be formed. The first heat dissipation layer 21 and the second heat dissipation layer 22 may be widely formed to extend to outside of the boundary of the flat display panel 1.

In forming the flat display panel 1 (S10), a plurality of spaced lower electrodes 51 may be further formed between the first heat dissipation layer 21 and the capsule layer 30, and a single continuous upper electrode 52 or a plurality of spaced upper electrodes 52 may be further formed between the capsule layer 30 and the second heat dissipation layer 22. In addition, a first insulating layer 53 may be formed between the first heat dissipation layer 21 and the lower electrodes 51. Furthermore, a plurality of first electrode patterns EP1 connected to the lower electrodes 51 and one second electrode pattern EP2 or a plurality of second electrode patterns EP2 connected to the upper electrode or electrodes 52 may be further formed in the transmission area A40 connected to the display area A10.

The lower electrodes 51 and the upper electrode or electrodes 52 may be formed in an area to be formed into the display area A10. In the area corresponding to the display area A10, the lower electrodes 51, the capsule layer 30, and the upper electrode or electrodes 52 may be formed. In the transmission area A40, the first electrode patterns EP1 may be formed in place of the lower electrodes 51, and the second electrode pattern or patterns EP2 may be formed in place of the upper electrode or electrodes 52. A third insulating layer 55 may be formed at the same layer as the capsule layer 30 between the first electrode patterns EP1 and the second electrode pattern or patterns EP2. One-side ends of the first electrode patterns EP1 and one-side ends of the second electrode patterns EP2 may be formed to be concentrated at a predetermined portion of the transmission area A40. The display area A10, the spare area A20, and the transmission area A40 may be disposed at an inside of the display panel 1.

After execution of the forming a flat display panel 1 (S10) described with reference to FIG. 14, the connection to a cooler 70 (S20), the forming a curved surface (S30), and the cutting a portion of the display panel 1 (S40), which have been described with reference to FIGS. 11 and 12, may be continuously performed. In the cutting a portion of the display panel 1 (S40), the removal area A50 and the heat dissipation path 61 disposed outside a boundary defined by a cutting line D (a dotted line) in FIG. 14 may be removed through cutting such that the display area A10, the spare area A20, and the transmission area A40 may remain, thereby forming the display panel 1 which has a curved surface.

Figure 15:
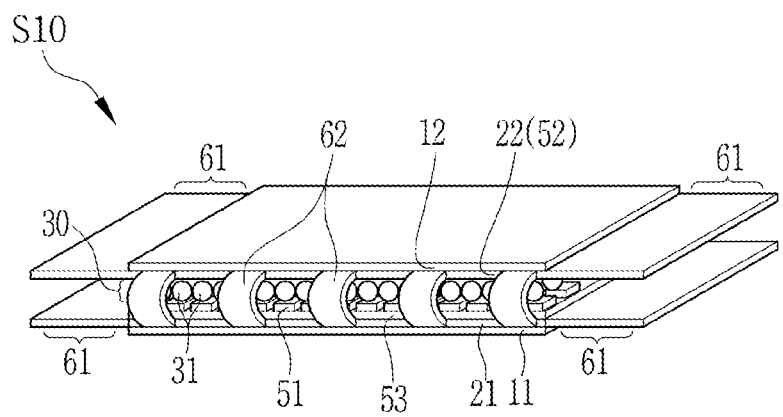
FIG. 15 is a view showing a structure obtained after a heat transfer path is further formed in forming the flat display panel in accordance with an embodiment.

FIG. 15 is a view showing a structure obtained after a heat transfer path 62 is further formed in forming the flat display panel in accordance with an embodiment.

As described above, in forming the flat display panel (S10), the first substrate 11, the first heat dissipation layer 21, the capsule layer 30, the second heat dissipation layer 22, and the second substrate 12 may be formed. The first heat dissipation layer 21 and the second heat dissipation layer 22 may be widely formed to extend to outside of the boundary of the flat display panel 1.

In forming the flat display panel (S10), the second heat dissipation layer 22 and the upper electrode 52 may be formed as a single continuous layer, using a transparent material having electrical conductivity. That is, as shown in FIG. 7, the upper electrode 52 and the second heat dissipation layer 22 may be formed as the same layer. In addition, a first insulating layer 53 made of an electrical insulating material may be further formed between the first heat dissipation layer 21 and the lower electrodes 51. An insulating material may fill a space among the lower electrodes 51, and an insulating material may also be formed among capsules 31.

The second heat dissipation layer 22 may be formed to have a small thickness because the second heat dissipation layer 22 should be made of a material transparent to visible light while having electrical conductivity in order to function as the upper electrode or electrodes 52. This is because the second heat dissipation layer 22 exhibits low transparency to visible light when the second heat dissipation layer 22 is formed to have a great thickness. On the other hand, when the second heat dissipation layer 22 is thinly formed, there may be a problem of a decrease in thermal conductivity. In order to solve such a problem, in forming the flat display panel (S10), a heat transfer path 62, which thermally interconnects the first heat dissipation layer 21 and the second heat dissipation layer 22, may be further formed.

The heat transfer path 62 may be a portion of the first heat dissipation layer 21 or the second heat dissipation layer 22. For example, the first heat dissipation layer 21 may be formed such that a portion of the first heat dissipation layer 21 may lengthily extend to be connected to the second heat dissipation layer 22. The heat transfer path 62 may transfer heat applied to the second heat dissipation layer 22 to the first heat dissipation layer 21. When the capsule 31 includes electrophoretic particles 32, the first heat dissipation layer 21 is not required to be transparent to visible light and, as such, may be thickly formed in order to increase thermal conductivity thereof. When a part of heat applied to the second heat dissipation layer 22 is transferred to the first heat dissipation layer 21 via the heat transfer path 62, the cooler 70 connected to the first heat dissipation layer 21 may absorb even heat applied to the second heat dissipation layer 22. Although the thickness of the second heat dissipation layer 22 is small, the second heat dissipation layer 22 may more efficiently dissipate heat through the first heat dissipation layer 21 connected thereto via the heat transfer path 62 while dissipating heat through the cooler 70 directly connected thereto.

After execution of the forming a flat display panel 1 (S10) described with reference to FIG. 15, the connection to a cooler 70 (S20), the forming a curved surface (S30), and the cutting a portion of the display panel 1 (S40), which have been described with reference to FIGS. 11 and 12, may be continuously performed. In the cutting a portion of the display panel 1 (S40), the heat dissipation path 61 may be removed through cutting, and the heat transfer path 62 may also be removed through cutting.

FIG. 16 is a view showing a structure obtained after heat blocking layers and heat dissipation layers are repeatedly formed in forming the flat display panel (S10) in accordance with an embodiment.

As described above, in forming the flat display panel (S10), the first substrate 11, the first heat dissipation layer 21, the capsule layer 30, the second heat dissipation layer 22, and the second substrate 12 may be formed. The first heat dissipation layer 21 and the second heat dissipation layer 22 may be widely formed to extend to outside of the boundary of the flat display panel 1. In forming the flat display panel (S10), the first insulating layer 53, the lower electrodes 51, and the upper electrode 52 may also be formed.

In forming the flat display panel 1 (S10), the first heat blocking layer 41 and the first heat dissipation layer 21 may be further formed between the first substrate 11 and the capsule layer 30 while alternating with each other one or more times, and the second heat blocking layer 42 and the second heat dissipation layer 22 may be further formed between the second substrate 12 and the capsule layer 30 while alternating with each other one or more times. That is, the display panel 1 may be formed through sequential stacking of a first substrate 11, a 1-1-th heat blocking layer 41a, a 1-1-th heat dissipation layer 21a, a 1-2-th heat blocking layer 41b, a 1-2-th heat dissipation layer 21b, a first insulating layer 53, a lower electrode 51, a 2-2-th heat dissipation layer 22b, a 2-2-th heat blocking layer 42b, a 2-1-th heat dissipation layer 22a, a 2-1-th heat blocking layer 42a, and a second substrate 12 in this order. In other words, in forming the flat display panel 1 (S10), plural pairs of heat blocking layers and heat dissipation layers may be formed.

When a plurality of first heat dissipation layers 21 and a plurality of first heat blocking layers 41 are repeatedly alternately formed, heat applied to the first substrate 11 may be blocked by the 1-1-th heat blocking layer 41a, and may be dissipated by the 1-1-th heat dissipation layer 21a, and residual heat may be blocked by the 1-2-th heat blocking layer 41b, and may be dissipated by the 1-2-th heat dissipation layer 21b. Similarly, when a plurality of second heat dissipation layers 22 and a plurality of second heat blocking layers 42 are repeatedly alternately formed, heat applied to the second substrate 12 may be blocked by the 2-1-th heat blocking layer 42a, and may be dissipated by the 2-1-th heat dissipation layer 22a, and residual heat may be blocked by the 2-2-th heat blocking layer 42b, and may be dissipated by the 2-2-th heat dissipation layer 22b. Accordingly, heat transferred to the capsule layer 30 may be minimized.

In the connection to a cooler 70 (S20), coolers 70 may be connected to the plurality of first heat dissipation layers 21a and 21b and the plurality of second heat dissipation layers 22a and 22b, respectively. Each cooler 70 may be connected to the heat dissipation path 61.

In forming the flat display panel 1 (S10), when the first substrate 11, the first heat dissipation layer 21, the capsule layer 30, the second heat dissipation layer 22, and the second substrate 12 are formed, at least one of a structure in which a heat transfer path is further formed, a structure in which a first insulating layer 53 and a lower electrode 51 are further formed, and a second heat dissipation layer 22 is formed of an electrical conductive material, a structure in which a heat blocking layer is further formed, and a structure in which heat dissipation layers and heat blocking layers are repeatedly alternately formed may be further formed.

Figure 17:
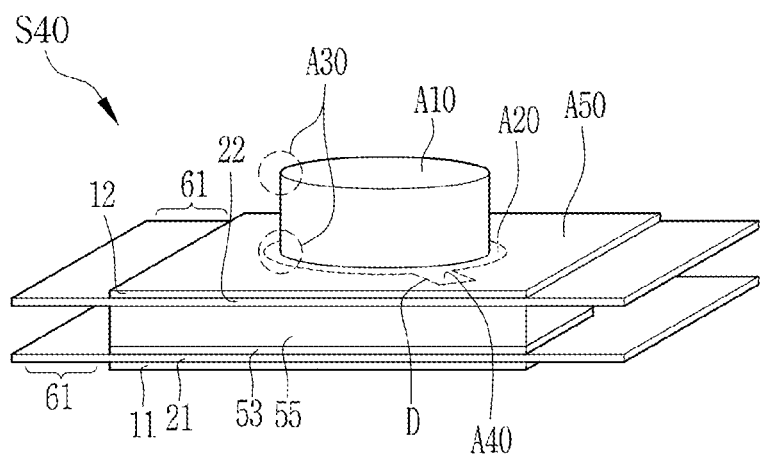
FIG. 17 is a view showing the cutting a portion of the display panel according to an embodiment.

FIG. 17 is a view showing the cutting a portion of the display panel 1 (S40) according to an embodiment.

The cutting a portion of the display panel 1 (S40) is a procedure for removing the removal area A50 from the display panel 1 molded to have a curved surface, through cutting. As shown in FIG. 17, the removal area A50 other than the display area A10 protruding in the form of a cup, the spare area A20 surrounding the display area A10, and the transmission area A40 protruding from one end of the spare area A20 may be removed from the display panel 1 which is formed with a button-shaped curved surface. In FIG. 17, the removal area A50 is disposed outside a cutting line D (a dotted line). Through removal of the removal area A50, the display panel 1 having the button-shaped curved surface as shown in FIG. 9 may be formed.

Generally, the display panel 1 is formed to have a quadrangular shape, and electrode patterns are disposed at an edge of the quadrangular display panel 1. For this reason, it is impossible to use a method in which a portion of the display panel 1 is cut such that the display panel 1 has a desired shape. On the other hand, the cutting a portion of the display panel 1 (S40) is different from a general display panel manufacturing method in that a curved surface is formed at the display panel 1 formed to have a quadrangular shape, and a portion of the display panel 1 is then removed through cutting, for manufacture of a final display panel.

As apparent from the above description, in accordance with the present disclosure, the display panel may not be broken by heat even when the display panel is subjected to thermoforming for formation of a curved surface.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

Simple modifications and alterations fall within the scope of the disclosure, and the protection scope of the disclosure will be apparent from the appended claims.

What is claimed is:
1. A display panel comprising:
a display area configured to display an image; and
a curved area formed at a part or an entirety of the display area,
wherein the display area comprises:
a first substrate;
at least one first heat dissipation layer formed on the first substrate;
a capsule layer disposed on the first heat dissipation layer, the capsule layer comprising a plurality of capsules configured to represent a color;
a second heat dissipation layer formed on the capsule layer and made of a transparent material; and
a second substrate formed on the second heat dissipation layer and made of a transparent material.
2. The display panel according to claim 1, further comprising:
a first heat blocking layer formed between the first substrate and the first heat dissipation layer and made of a material having low thermal conductivity; and
a second heat blocking layer formed between the second heat dissipation layer and the second substrate and made of a material having low thermal conductivity.
3. The display panel according to claim 1, wherein the capsules are made of a flexible material so that, when the capsules are deformed, the capsule disposed in the curved area has a diameter greater than a diameter of the capsule disposed in an area other than the curved area.

4. The display panel according to claim 1, wherein:
each of the capsules comprises a plurality of quantum dots dispersed by a solvent; and
the first heat dissipation layer and the first substrate are made of a transparent material.

5. The display panel according to claim 1, further comprising:
a plurality of lower electrodes formed between the first heat dissipation layer and the capsule layer and spaced apart from one another; and
one upper electrode or a plurality of spaced upper electrodes formed between the capsule layer and the second heat dissipation layer and made of a transparent material having electrical conductivity,
wherein each of the capsules comprises a plurality of electrophoretic particles movable by an electric field formed between the lower electrodes and the upper electrode or electrodes in accordance with a pixel control signal.

6. The display panel according to claim 5, further comprising:
a first insulating layer formed between the first heat dissipation layer and the lower electrodes and made of an electrical insulating material; and
a second insulating layer formed between the second heat dissipation layer and the upper electrode or electrodes and made of an electrical insulating material.

7. The display panel according to claim 5, further comprising:
a first insulating layer formed between the first heat dissipation layer and the lower electrodes and made of an electrical insulating material,
wherein the second heat dissipation layer and the upper electrode are formed as a single continuous layer.

8. The display panel according to claim 5, further comprising:
a transmission area configured to transmit the pixel control signal to the display area,
wherein the transmission area comprises:
a plurality of first electrode patterns connected to the lower electrodes;
one second electrode pattern or a plurality of second electrode patterns connected to the upper electrode or electrodes; and
a third insulating layer configured to insulate the first electrode patterns and the second electrode pattern or patterns,
wherein the first electrode patterns and the second electrode pattern or patterns are concentrated, at one-side ends thereof, in a connector area, for connection thereof to a circuit board configured to output the pixel control signal.

9. The display panel according to claim 5, further comprising:
a transmission area configured to transmit the pixel control signal to the display area; and
a spare area surrounding the display area and the transmission area,
wherein the curved area is formed at a part or entirety of the display area, the transmission area or the spare area.

10. The display panel according to claim 1, wherein each of the first substrate and the second substrate is formed of a thin glass having a thickness of 1 mm or less.

11. The display panel according to claim 10, further comprising:

a first thermoforming film disposed at a lower surface of the first substrate and configured to maintain a shape deformed through thermoforming; and
a second thermoforming film disposed at an upper surface of the second substrate, made of a transparent material, and configured to maintain a shape deformed through thermoforming.

12. A method of manufacturing a display panel, comprising:
forming a flat display panel comprising a display area configured to display an image through stacking of a first substrate, a first heat dissipation layer, a capsule layer, a second heat dissipation layer, and a second substrate;
connecting the first heat dissipation layer and the second heat dissipation layer to a cooler; and
forming a curved surface at a part or an entirety of the display area through application of heat to the first substrate and the second substrate,
wherein, in the forming a curved surface, heat transferred to a capsule of the capsule layer is dissipated to the cooler via the first heat dissipation layer or the second heat dissipation layer.

13. The method according to claim 12, wherein:
in the forming a flat display panel, the first heat dissipation layer or the second heat dissipation layer wider than the display panel is stacked such that at least a portion of the first heat dissipation layer or the second heat dissipation layer protrudes outside the display panel, thereby forming a heat dissipation path; and
in the connection to a cooler, a heat dissipation path of the first heat dissipation layer or a heat dissipation path of the second heat dissipation layer is connected to the cooler.

14. The method according to claim 12, wherein:
in the forming a flat display panel, a first heat blocking layer made of a material having low thermal conductivity is further formed between the first substrate and the first heat dissipation layer; and
in the forming a flat display panel, a second heat blocking layer made of a material having low thermal conductivity is further formed between the second heat dissipation layer and the second substrate.

15. The method according to claim 12, wherein:
in the forming a flat display panel, a plurality of spaced lower electrodes is further formed between the first heat dissipation layer and the capsule layer in the display area, and a single continuous upper electrode or a plurality of spaced upper electrodes is further formed between the capsule layer and the second heat dissipation layer in the display area; and
in the forming a flat display panel, a plurality of first electrode patterns connected to the lower electrodes and one second electrode pattern or a plurality of second electrode patterns connected to the upper electrode or electrodes are further formed in a transmission area connected to the display area.

16. The method according to claim 15, wherein, in the forming a flat display panel, the second heat dissipation layer and the upper electrode are formed as a single continuous layer, using a transparent material having electrical conductivity.

17. The method according to claim 12, wherein, in the forming a flat display panel, a heat transfer path configured to thermally interconnect the first heat dissipation layer and the second heat dissipation layer is further formed.

18. The method according to claim 12, further comprising:
cutting a portion of the display panel corresponding to a removal area, except for the display area configured to display an image, a transmission area configured to transmit a pixel control signal to the display area, and a spare area surrounding the display area and the transmission area.

19. The method according to claim 12, wherein, in the forming a curved surface, a portion of the flat display panel to be formed into a curved area is heated and pressed using a first mold and a second mold formed to have a predetermined curved surface shape, thereby thermoforming the first substrate and the second substrate.

* * * * *